United States Patent
Yerli

(10) Patent No.: US 9,191,355 B2
(45) Date of Patent: Nov. 17, 2015

(54) COMPUTER-IMPLEMENTED METHOD FOR POSTING MESSAGES ABOUT FUTURE EVENTS TO USERS OF A SOCIAL NETWORK, COMPUTER SYSTEM AND COMPUTER-READABLE MEDIUM THEREOF

(75) Inventor: Cevat Yerli, Frankfurt am Main (DE)

(73) Assignee: Crytek GmbH, Frankfurt am Main (DE)

( * ) Notice: Subject to any disclaimer, the term of this patent is extended or adjusted under 35 U.S.C. 154(b) by 147 days.

(21) Appl. No.: 13/612,773

(22) Filed: Sep. 12, 2012

(65) Prior Publication Data

US 2013/0212192 A1    Aug. 15, 2013

Related U.S. Application Data

(60) Provisional application No. 61/533,279, filed on Sep. 12, 2011, provisional application No. 61/533,277, filed on Sep. 12, 2011.

(51) Int. Cl.
*H04L 12/58*    (2006.01)
*G06Q 10/00*    (2012.01)
(Continued)

(52) U.S. Cl.
CPC ............... *H04L 51/32* (2013.01); *G06Q 10/00* (2013.01); *G06F 13/14* (2013.01); *G06F 15/0266* (2013.01); *H04L 7/00* (2013.01)

(58) Field of Classification Search
CPC .......... G06F 3/01; G06F 15/16; G06F 17/00; G06F 17/30; G06F 13/00; G06F 13/10; G06F 13/14; G06F 15/00; G06F 15/025; G06F 15/0266; G06F 17/20; G06F 17/3002; G06F 17/30023; G06F 17/30029; G06F 17/30038; G06F 17/30044; G06F 17/60; G06Q 30/00; G06Q 10/00–10/025; G06Q 10/06; G06Q 10/10; G06Q 10/109–10/1095; H04H 1/00; H04N 7/10; H04N 7/14; H01J 13/00; H04L 7/00; H04L 51/00; H04L 51/02; H04L 51/04; H04L 51/08; H04L 51/10; H04L 51/14–51/20; H04L 51/24; H04L 51/32
USPC .......................... 707/769, E17.108; 715/753; 709/204–206, 250
See application file for complete search history.

(56) References Cited

U.S. PATENT DOCUMENTS 5,754,939  A  *  5/1998  Herz et al. .................... 455/3.04
7,669,123  B2 *  2/2010  Zuckerberg et al. .......... 715/273
(Continued)

FOREIGN PATENT DOCUMENTS

CN        1708986  A     12/2005
CN      101366029  A      2/2009
(Continued)

OTHER PUBLICATIONS

Facebook Rearranges Events Page To Be More Like Other Pages; Eric Eldon; Jul. 16, 2010.*
(Continued)

*Primary Examiner* — Brian J Gillis
*Assistant Examiner* — Boris Grijalva Lobos
(74) *Attorney, Agent, or Firm* — Christensen O'Connnor Johnson Kindness PLLC

(57) ABSTRACT

The present disclosure relates in general to social networks run in a computer environment and in particular to methods and systems for posting messages about future events to users of a social network who are registered users of the social network, preferably in accordance with selectable, pre-selectable or adjustable settings for individual users. The method and system allows a user to post a message about a future plan or event that is taking place at a specified time rather than the time that the message is sent. The approach according to the present disclosure is directed to a unique way of social networking via an ordered list of events, such as a timeline or calendar, that shows when future plans will take place, and to a 'matchmaking' service between people organizing or taking part in such an event and other users who may also be interested in that event.

21 Claims, 11 Drawing Sheets

(51) Int. Cl.
  *H04L 7/00* (2006.01)
  *G06F 13/14* (2006.01)
  *G06F 15/02* (2006.01)

(56) References Cited

U.S. PATENT DOCUMENTS

| | | | |
|---|---|---|---|
| 7,822,745 B2* | 10/2010 | Fayyad et al. | 707/732 |
| 7,827,208 B2* | 11/2010 | Bosworth et al. | 707/802 |
| 8,224,851 B2 | 7/2012 | Banda | |
| 8,271,266 B2* | 9/2012 | Gallagher et al. | 704/10 |
| 8,375,068 B1* | 2/2013 | Platt et al. | 707/805 |
| 8,606,872 B1* | 12/2013 | Reitnour et al. | 709/206 |
| 2005/0198031 A1 | 9/2005 | Pezaris | |
| 2007/0016609 A1 | 1/2007 | Kim | |
| 2007/0083536 A1* | 4/2007 | Darnell et al. | 707/101 |
| 2007/0132767 A1* | 6/2007 | Wright et al. | 345/475 |
| 2007/0174247 A1 | 7/2007 | Xu | |
| 2007/0174389 A1* | 7/2007 | Armstrong et al. | 709/204 |
| 2007/0214141 A1* | 9/2007 | Sittig et al. | 707/7 |
| 2008/0034307 A1* | 2/2008 | Cisler et al. | 715/764 |
| 2008/0040475 A1 | 2/2008 | Bosworth | |
| 2008/0046976 A1* | 2/2008 | Zuckerberg | 726/4 |
| 2008/0077585 A1 | 3/2008 | Li | |
| 2008/0294663 A1* | 11/2008 | Heinley et al. | 707/100 |
| 2009/0006442 A1 | 1/2009 | Anderson | |
| 2009/0070412 A1 | 3/2009 | D'Angelo | |
| 2009/0094190 A1 | 4/2009 | Stephens | |
| 2009/0171869 A1 | 7/2009 | Liu | |
| 2009/0216569 A1* | 8/2009 | Bonev et al. | 705/5 |
| 2009/0248494 A1 | 10/2009 | Hueter | |
| 2009/0319914 A1 | 12/2009 | Roseway | |
| 2010/0088322 A1 | 4/2010 | Chowdhury | |
| 2010/0199192 A1 | 8/2010 | Sittig | |
| 2010/0306249 A1* | 12/2010 | Hill et al. | 707/769 |
| 2011/0004831 A1* | 1/2011 | Steinberg et al. | 715/753 |
| 2011/0041080 A1* | 2/2011 | Fleischman et al. | 715/751 |
| 2011/0145719 A1 | 6/2011 | Chen | |
| 2011/0153377 A1 | 6/2011 | Novikov | |
| 2011/0173198 A1 | 7/2011 | Malleshaiah | |
| 2011/0276372 A1* | 11/2011 | Spivack et al. | 705/14.5 |
| 2012/0072845 A1 | 3/2012 | John | |
| 2012/0110052 A1 | 5/2012 | Smarr | |
| 2012/0117094 A1 | 5/2012 | Pratt | |
| 2012/0173626 A1 | 7/2012 | Reis | |
| 2013/0007661 A1 | 1/2013 | Klappert | |
| 2013/0159883 A1* | 6/2013 | Yerli | 715/753 |
| 2013/0159885 A1* | 6/2013 | Yerli | 715/753 |
| 2013/0212491 A1* | 8/2013 | Yerli | 715/753 |

FOREIGN PATENT DOCUMENTS

| | | |
|---|---|---|
| WO | 2007/076150 A2 | 7/2007 |
| WO | 2011/011398 A2 | 1/2011 |
| WO | 2011/082496 A1 | 7/2011 |

OTHER PUBLICATIONS

Merriam-Webster definition of "index".*
Definition of timeline by TheFreeDictionary.com.*
Extended European Search Report mailed Dec. 4, 2012, issued in European Application No. 12183982.3, filed Sep. 12, 2012, 6 pages.
European Search Report mailed Jun. 20, 2013, in European Application No. 12 19 5805.2 filed Dec. 6, 2012, 6 pages.
Office Action dated Aug. 12, 2014, in U.S. Appl. No. 13/612,765, filed Sep. 12, 2012, 24 pages.
Office Action dated Oct. 3, 2014, in U.S. Appl. No. 13/719,132, filed Dec. 18, 2012, 43 pages.
Final Office Action mailed Feb. 27, 2015, from U.S. Appl. No. 13/612,765, filed Sep. 12, 2012, 24 pages.
Final Office Action mailed Mar. 27, 2015, from U.S. Appl. No. 13/719,132, filed Dec. 18, 2012, 29 pages.
First Office Action mailed Apr. 17, 2015, issued in corresponding Chinese Application No. 201210336565.8, filed Sep. 12, 2012, 12 pages.

* cited by examiner

COMPUTER-IMPLEMENTED METHOD FOR POSTING MESSAGES ABOUT FUTURE EVENTS TO USERS OF A SOCIAL NETWORK, COMPUTER SYSTEM AND COMPUTER-READABLE MEDIUM THEREOF

CROSS-REFERENCE TO RELATED APPLICATIONS

This application claims the benefit of U.S. Provisional Patent Application No. 61/533,277, filed Sep. 12, 2011, entitled "A computer-implemented method for displaying an individual timeline of a user of a social network, computer system and computer readable medium thereof," the disclosure of which is incorporated by reference herein in its entirety, and of U.S. Provisional Patent Application No. 61/533,279, filed Sep. 12, 2011, entitled "A computer-implemented method for posting messages about future events to users of a social network, computer system and computer-readable medium thereof," the disclosure of which is incorporated by reference herein in its entirety.

TECHNICAL FIELD

The present disclosure relates in general to social networks run in a computer environment and relates in particular to methods and systems for posting messages.

BACKGROUND

With the increasing popularity of social networking, traditional forms of joining, sharing interests and hobbies, and making appointments, e.g., by joining social clubs, attending social events, meeting friends through other friends, and so forth, are replaced by social activities via the Internet, in particular by some sort of social forum for networking and meeting new people. It can even be said that for many people, the Internet nowadays represents the principal way in which the people meet new friends and remain in touch with existing friends, because the Internet enables establishing and maintaining interactions between vast numbers of individuals.

For this purpose various social networking websites have been developed in recent years. Social networking websites can provide organizational tools and forums for allowing these individuals to interact with one another via the social networking website. Many users prefer to limit communications to specific groups of other users or friends sharing the same or similar interests and activities.

The classic way of displaying activities in a time-related fashion is by using a calendar showing either days, weeks, or months as boxes. Events are visible, but no additional value is added, especially not in relation to its importance or to other activities. While this classic way is well suited for an office environment, user interaction in social networks and forums requires new tools and functionality.

US 2010/0088322 A1 discloses a method for identifying so-called hot topics. For this purpose a news stream is analyzed for keywords and the frequency of citation of the keywords is determined. The method also utilizes a graphical representation for visualizing this frequency of citation of the keywords. If the frequency exceeds a predetermined threshold value, a keyword becomes a hot topic that is, e.g., displayed in an online community and thus communicated to a plurality of users potentially interested in this topic.

US 2009/0171869 A1 discloses a related method, which tries to predict hot terms in the future. For this purpose a categorization model is used.

US 2007/0016609 A1 relates to a method for analyzing news streams utilizing tools that can analyze content to determine its traits, classify the content based on its traits, and present the content in a user interface tailored to the classification. The tools can also organize content items into groups based on a common trait and enable a user to select content items through their group. Responsive to the user's selection of a group, the tools can present content, render enclosures, and alter traits of the content items in the group. The content is not tagged with time-information.

US 2009/0319914 A1 discloses a method for determining a relationship between participants in an online community based on various facts. The nature of the relationship is represented in a user interface (UI) by a visual element that shows the extent or depth of the relationship. Facets of the relationship may be used to facilitate interaction between participants (e.g., if two participants both like a particular band, then information relevant to the band may be shown as part of the UI when the participants interact with each other). The nature of the relationship may be determined or characterized based on commonality of activities, commonality of interests, the extent to which the participants have interacted with each other in the past, or other facts.

US 2005/0198031 A1 discloses a method and system for controlling access to content in a social networking environment. A first user can define relationships with a plurality of second users by assigning one or more relationship designators for each relationship. The first user stores content within the social networking environment and denotes individuals allowed to or prevented from accessing the content by entering one or more relationship designators. The first user may further control access by using tier designators. The social networking environment may generate a proximity index based on the relationships between a first user and a particular second user. The first user may control access to content based on the proximity index. The first user may also allow or prevent the reception of content from other users having particular relationship designators, tier designators, and/or proximity indices with respect to the first user. Alternatively, in this system environment, the content of a personal calendar of an individual user of the social network can be shared with other members of the social network. However, no specific graphical representation of the calendar is required.

US 2007/0214141 A1 discloses a system and method for generating a social timeline. A plurality of data items associated with at least one relationship between users associated with a social network is received. Each data item is associated with a specific time-tag representing an event in the past. The data items are ordered according to the at least one relationship and a social timeline is generated according to the ordered data items. This social timeline includes only events in the past of at least two users connected with each other as friends in the social network. The graphical representation of the events of the users is performed in a uniform standard manner.

SUMMARY

The present application is directed to an enhanced method and system for posting messages about future events to other users of a social network. In at least one embodiment, the users may be registered users (members) of the social network, and the messages may be posted in accordance with selectable, pre-selectable or adjustable settings for individual users. The method and system according to at least one embodiment of the present disclosure allows a user to post a message about a future plan that can be seen to take place at a specified time rather than the time that the message is sent. The approach according to the present disclosure is directed to a unique way of social networking via an ordered list of events, such as a timeline or calendar, that shows when future events will take place and to a 'matchmaking' service between people organizing or taking part in such an event, and other users who may also be interested in that event. It can be used by both individuals and companies to arrange activities online (such as gaming sessions among groups of friends or a sale at a particular website) or offline (from flashmobs to the announcing and advertising of concert tours).

According to at least one embodiment of the present disclosure, a computer-implemented method for posting messages about future events to users of a social network, comprises: maintaining in a computer system, for each user of the social network, data on individual preferences and/or interests of the user; obtaining input data including data on an event taking place in the future; attributing a time-tag to the event corresponding to the input data; attributing at least one keyword to the event, wherein the keyword indicates preferences and/or interests of users that might be interested in receiving information about the event; generating a message to users of the social network, including at least the data on the event and the time-tag; determining, based on the data on individual preferences and/or interests maintained in the computer system and on the keyword(s), one or more target users having individual preferences and/or interests matching to the keyword(s); sending the message to the one or more target users via the social network; and, automatically entering the event in a list of events of each of the target users based on the message, wherein the events in the list of events are sorted in their chronological order.

DESCRIPTION OF THE DRAWINGS

Hereinafter embodiments of the present disclosure will be set forth in an exemplary manner and with reference to the enclosed drawings, from which further features, advantages and technical effects achieved will become apparent. In the drawings.

DETAILED DESCRIPTION

Figure 1:
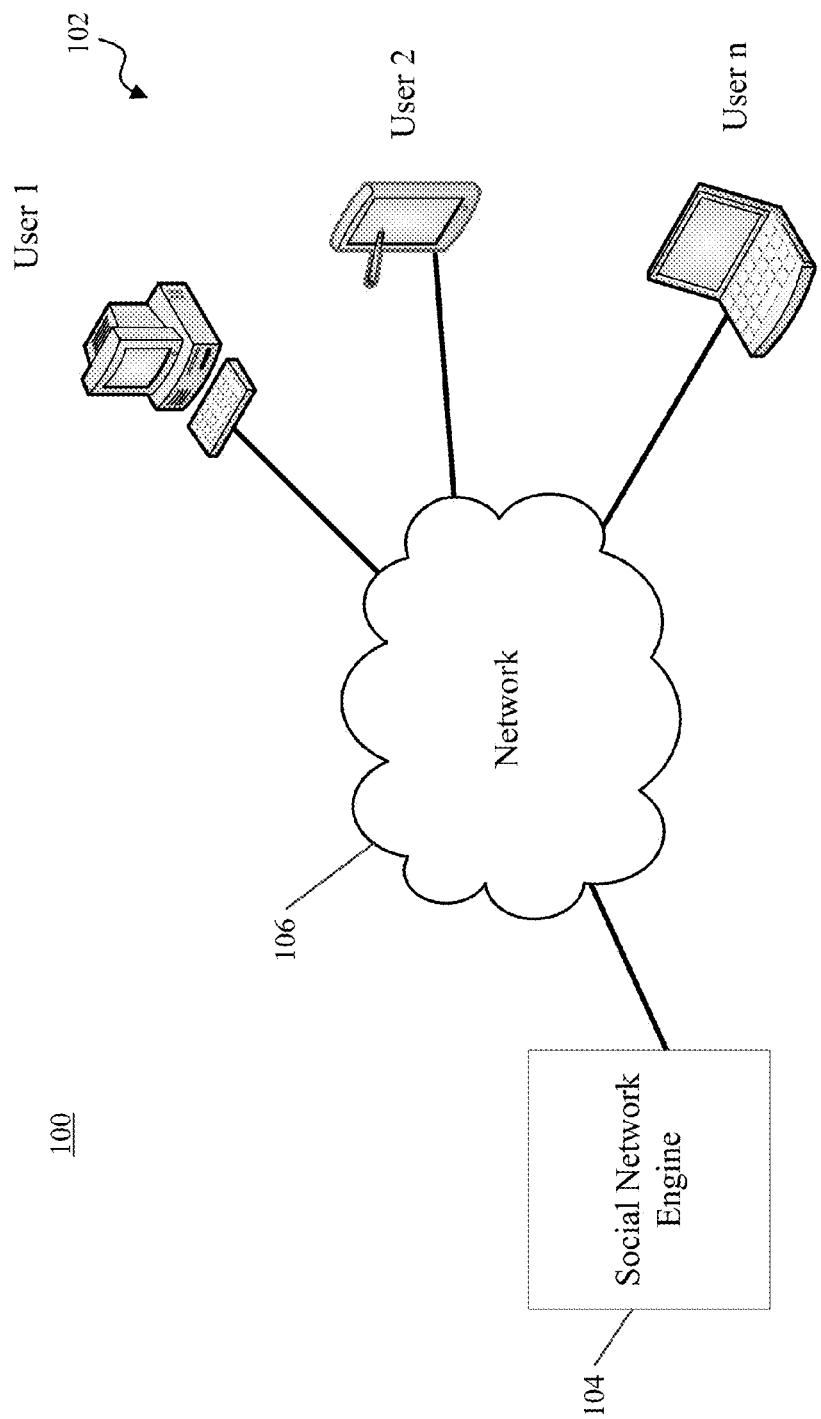
FIG. 1 is a schematic block diagram of a system environment for implementing a social network.

FIG. 1 is a schematic block diagram of a system environment 100 for implementing a social network according to an embodiment. One or more users 102, identified as user 1, user 2, . . . , user N, are in communication with a social network engine 104 via a network 106. The social network engine 104 operates a social networking website and may include one or more servers (not specifically shown) or any other device or application capable of providing social networking services via the network 106. The users 102 can access the services provided by the social network engine 104 via the network 106.

The users 102 may use a computing device, such as a laptop or desktop computer, a smart phone, a personal digital assistant (PDA), a set top box, and so forth to access the social network engine 104. The users 102 can view data about social network members, view a timeline as outlined in the following, enter data about themselves and possibly others, join social network groups, and so forth. The users 102 are typically members of a social networking website associated with the social network engine 104.

When connected to the social network, a user, such as user 1, can identify one or more other members associated with the social network engine 104 as friends, such as user 2. Friends will usually share similar preferences and/or interests and such relationships can be established based on user input, e.g., when a user explicitly identifies another member of the social network as a friend based, e.g., on similar preferences or interests as determined based on individual preferences input by the two users. As an alternative, such relationships can be established based on user interaction with the social network and as a result of a proposal generated automatically by the social network and sent as a message to two users asking them for confirmation whether the respective other user shall be a friend. Such a proposal can be made by the social network engine 104 based on an automatic search in the preferences and/or interests stored in the social network engine for preferences and/or interests of two users matching each other suitably well.

The relationship between users 102 of the social network may be confirmed, based on the input, by the social network engine 104. Alternatively, the existence of the relationship may be denied, according to some embodiments. Any type of confirmation and/or input may be utilized to alter, deny, and/or establish the relationship between users 102.

In the following, general aspects of a system environment for running a social network according to the present disclosure will be described with reference to FIGS. 2 to 6. Those features relating specifically to a method according to the present disclosure for posting messages about future events in such a system environment will then be described in more detail with reference to FIGS. 7 to 11.

Figure 2:
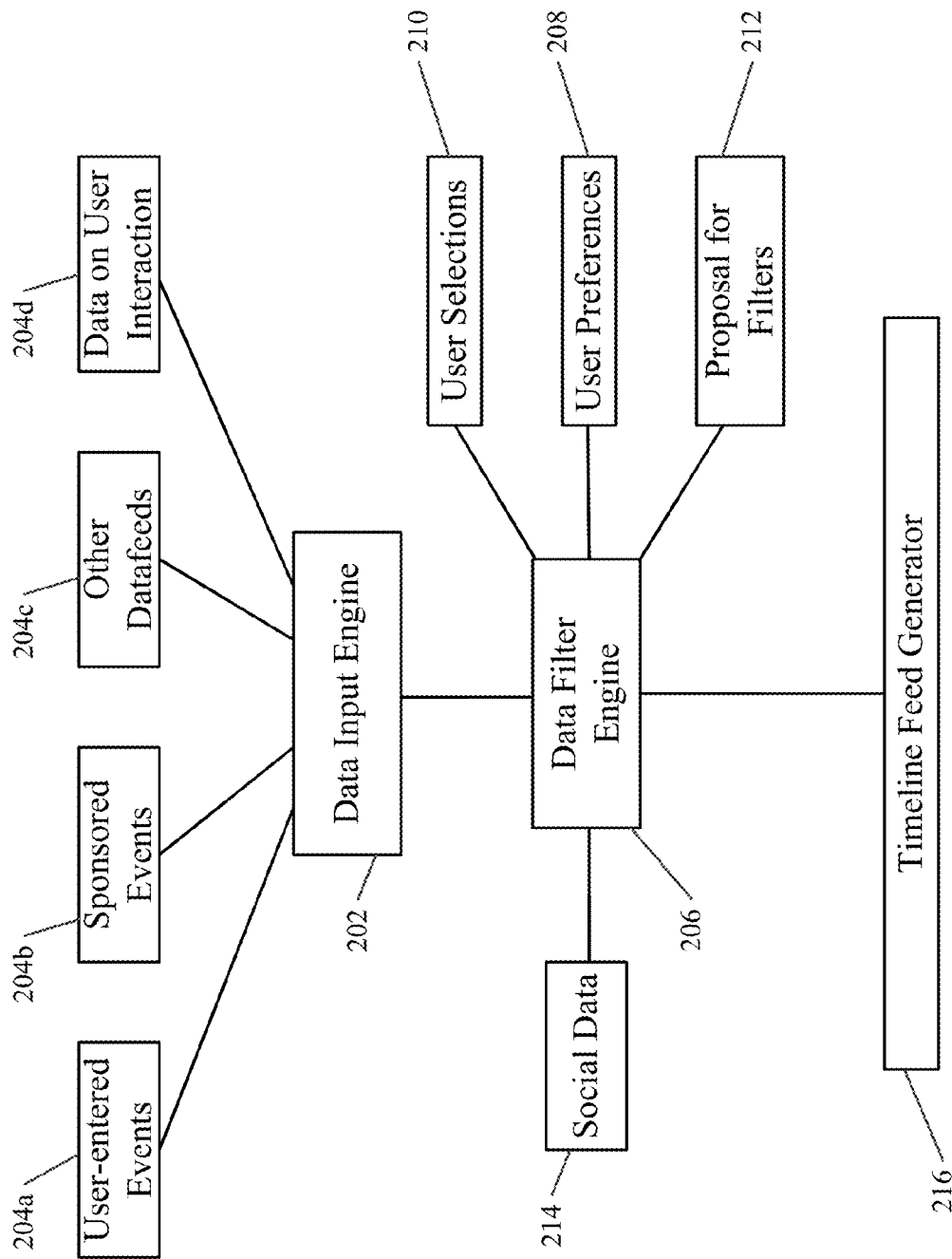
FIG. 2 is a schematic block diagram summarizing processes of obtaining input data and filtering the input data in accordance with the personal preferences and/or interests of an individual user of the social network according to FIG. 1.

FIG. 2 is a schematic block diagram summarizing processes of obtaining input data and filtering the input data in accordance with personal preferences and/or interests of an individual user of the social network according to FIG. 1. All data are input via a data input engine 202, which can be a component of the aforementioned social network engine 104. Various types of data input may be provided. For example, the data input may consist of all kinds of data about events 204a explicitly input by the user via a user interface, such as a keyboard, graphical user interface (GUI), or interface with other peripheral devices, such as video cameras and the like. The data input may also consist of data on sponsored events 204b, which may be information provided by subscribers, usually commercial subscribers, of the services rendered by the provider of the social network. As an example, a developer or publisher of video games may subscribe to the social network or may be a member of the social network and may feed data to the social network about new games to be launched in the future and information thereabout, such as information about online events relating to the product launch or launch of trailers relating to the new video game. The data input may also consist of other datafeeds 204c, such as RSS-feeds. In a system environment, the data input may additionally include data on the interaction 204d of the specific user associated with the list of events to be generated or of all users of the social network or of subgroups of the social network, such as special communities, such data being generated by continuously monitoring and analyzing the user interactions in accordance with search criteria. As an example, the provider of the social network may monitor and analyze, e.g., only if the users agree to, all interactions of the users of the social network associated with video games and may prepare these data as input data. For this purpose, events, such as when a user decides to watch a trailer of a new video game to be launched soon (e.g., by clicking on an icon or link to the trailer) or decides to play a test version of the new video game, are associated or linked with keywords describing the event (e.g., in the example, the name of the new video game).

All the above input data may be associated with certain keywords regarding the event. Such keywords may briefly categorize the content, purpose, place, length, etc., of the event, or categorize any action involved in the event. These keywords may be used later for deciding whether a specific event matches the individual preferences and/or interests of a user and whether the event shall be displayed in the personal timeline of the user.

Of course, instead of words, the phrase "keyword" as used herein may involve any other kind of data that may be used to categorize events. As will be explained in the following in more detail, such keywords may be explicitly input by users, may be automatically generated or proposed based on an analysis of the input data, or may be proposed by the system and used only after being accepted by a prompted user or being in accordance with the individual preferences and/or interests of a user.

According to the present disclosure, events are associated with time-tags, which are usually automatically generated while entering the input data about the events, but which may also be generated by user interaction. Such time-tags enable the sorting of a plurality of events in chronological order, as a prerequisite for displaying selected ones of these events in chronological order in the individual list of events of a user.

The aforementioned input data may be stored in a database of the social network engine, usually together with the keywords and the associated time-tags.

As shown in FIG. 2, the system further comprises a data filter engine 206, which filters the aforementioned input data or any data derived from these input data and transferred from the data input engine 202. The data filter engine 206 will usually be operative on the side of the provider of the social network as part of the social network engine 104, but may, in principle, also be located on the side of the user. As shown in FIG. 2 the data filter engine 206 is fed with user preferences and/or interests 208, possibly also with user selections 210, which might encode specific preferences and/or interests of a user, and might also be fed with proposals for filters 212, e.g., in the case where a sponsored subscriber of the social network wishes to promote a new video game and thus causes the social network engine to invite all users of the social network or selected ones of these users to add certain preferences and/or interests to the personal profile of the user in order to increase his or her interest in video games in general or in a specific video game in particular.

Finally, as shown in FIG. 2, the data filter engine 206 may also be fed with so-called social data 214, as the result of interactions of the users of the social network or of subgroups thereof, such as communities. As an example, if the total number or percentage of users showing interest in a new video game, either by explicitly mentioning the name of the new video game when being prompted for such input or implicitly, e.g., as the result of user interactions, e.g., when the users click on a link or icon associated with the new video game, exceeds a certain threshold, the social network engine 104 may invite all users of the social network or selected ones of these users to add certain preferences and/or interests to the personal profile of the user in order to increase his or her interest in the new video game. These invitations may either be accepted by the prompted users by means of a confirmative action, such as clicking on a "YES" button, or may be accepted automatically, depending on the individual user profile or on the regulations of the provider of the social network.

As shown in FIG. 2, the aforementioned input data are filtered by the data filter engine 206 in accordance with the user-specific preferences and/or interests of the target users, i.e., of the owners of the particular lists of events to be generated and displayed. As an example, if the input data include data relating to video game events and political events in the future, but the individual preferences and/or interests 208 of a user indicate that the particular user is highly interested in video games but not at all in political events, all (or most of the) data relating to the political events will be filtered out and only those relating to video games will be passed through the data filter engine 206 for display in the personal list of events of the target user by means of the time feed generator 216 shown in FIG. 2. However, according to an embodiment, all events relating to the above input data are automatically entered in the list of events of the target users determined by the system.

Figure 3:
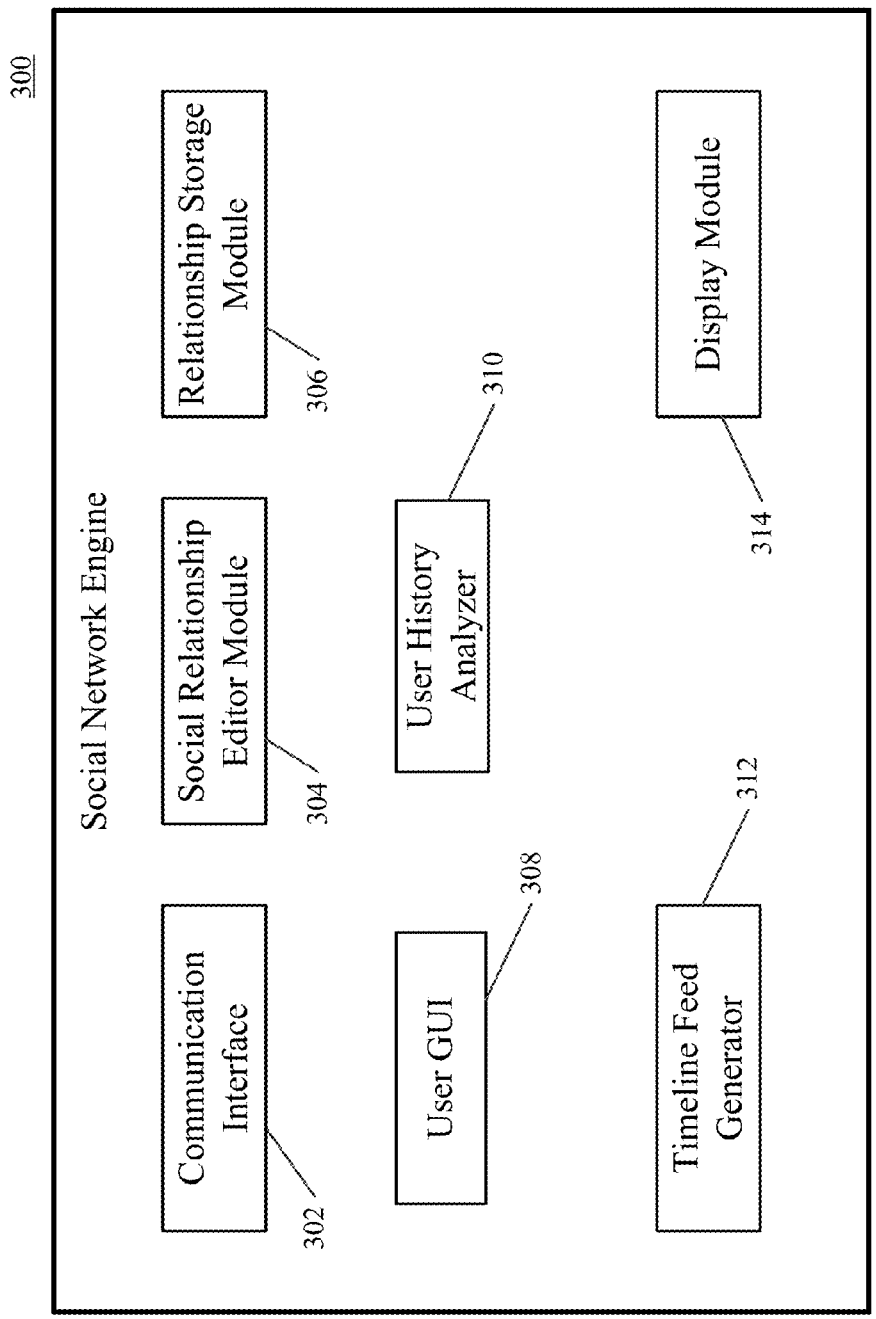
FIG. 3 is a schematic block diagram of a social network engine as shown in FIG. 2.

For implementing the above functionality, a social network engine 300 may include the components shown in FIG. 3, although the present disclosure shall not be limited to only those components shown in FIG. 3. More specifically, the social network engine 300 may include a communication interface 302 for handing all communication and exchange of data between the user and the social network engine 300 or with other users of the social network, in particular target users. The social network engine 300 may also include a social relationship editor module 304, which functions in particular for identifying other users of the social network as friends and for monitoring and analyzing the data traffic in the social network for identifying potential new friends for specific users, e.g., based on the past user interaction in the social network. Additionally, the social network engine 300 may include a relationship storage module 306 for storing these identified or potential relationships, a module 308 for driving a user graphical user interface (GUI), a user history analyzer 310 for monitoring and analyzing the interaction of a specific user or of all users of the social network or of subgroups thereof, such as communities, a timeline feed generator 312 as outlined above with reference to FIG. 2, and a display module 314 configured for providing a display of the user's electronic device with the relevant data for displaying a list of events in the future in a manner according to the principles of the present application. In at least one embodiment, the list may be in the form of a timeline.

Figure 4:
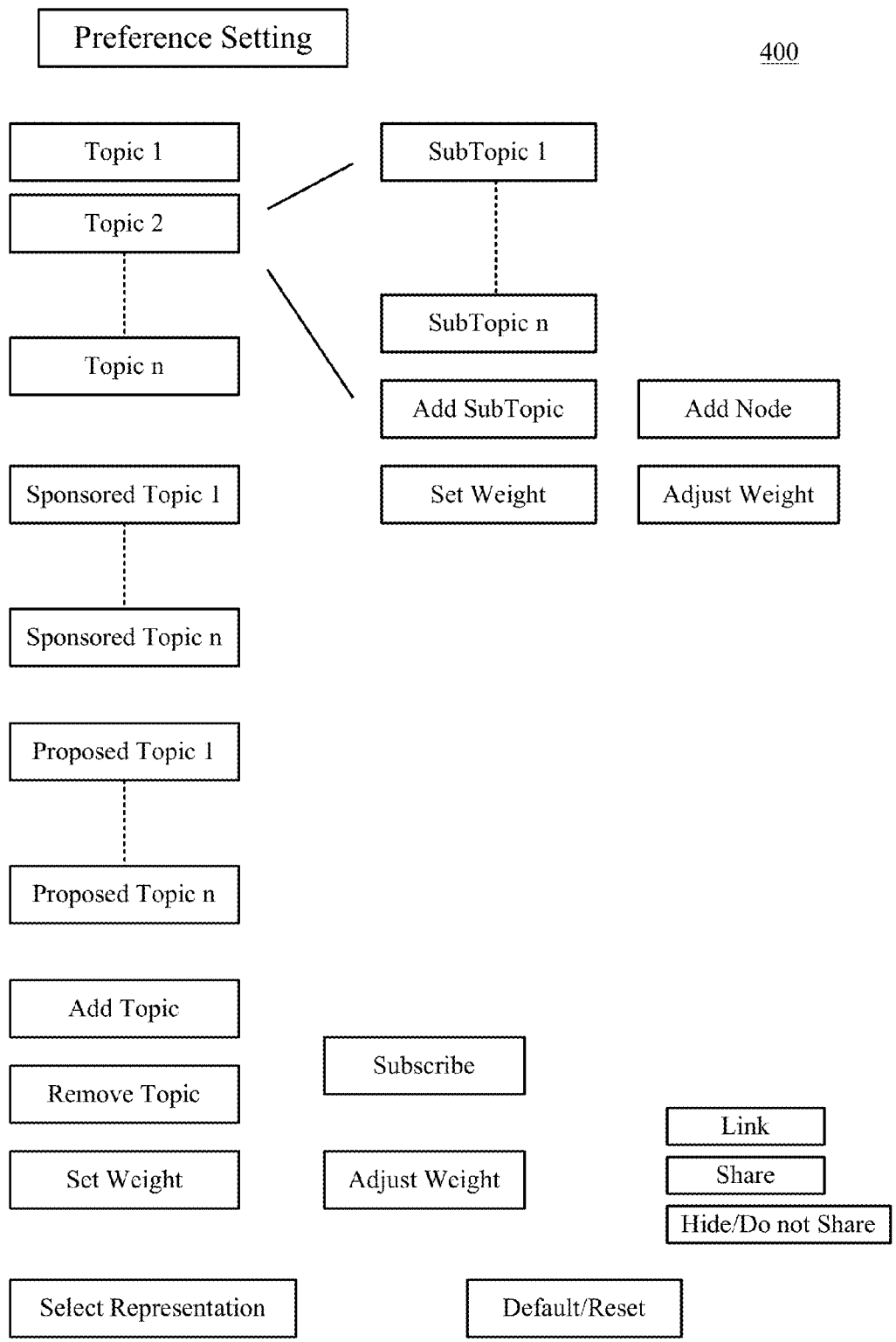
FIG. 4 is a schematic diagram summarizing options presented to a user to set or adjust preferences and/or interests when interacting with the social network according to FIG. 1.

As set forth above, a user may specify individual preferences and/or interests when using and navigating the social network. The term "individual preferences and/or interests" in the sense of the present disclosure comprises all suitable criteria and data for reliably identifying individual preferences, interests, dispositions, favorites, long-time user behavior, etc., of a specific user when exploring the social network. These individual preferences and/or interests may be input explicitly by the user by means of a web-oriented input mask as shown in FIG. 4, presenting a variety of options to a user to set or adjust his or her individual preferences and/or interests when interacting with the social network. It will be apparent that the input mask shown in FIG. 4 serves as only one example that shall not be construed to limit the scope of the present application. According to the present disclosure, these individual preferences and/or interests may, however, also be input implicitly as outlined below, or automatically as outlined below in more detail.

More specifically, for a user to select and adjust his or her individual preferences and/or interests, the social network engine may present an input mask 400 as shown in FIG. 4, e.g., when clicking on a menu button "PREFERENCE SETTING." Under this menu item, the input mask 400 presents a list of topics identified as TOPIC 1, ..., TOPIC N, which may be pre-selected topics pre-defined by the provider of the social network. The list may, however, also be the result of a background computation, e.g., based on the list of preferred topics of friends with whom the specific user is already connected. As an example, these topics may include "FRIENDS' ACTIVITIES," "GAMES," "RESULTS OF ONLINE-GAMING EVENTS," "COMMUNITY NEWS" and the like. As shown in FIG. 4, this list may further include so-called sponsored topics "SPONSORED TOPIC 1," ..., "SPONSORED TOPIC N," which may be topics pre-defined by the provider of the social network, e.g., because of commercial interests of the provider such as advertisement and promoting of goods of customers or affiliated companies.

As shown in FIG. 4, the list of topics may also include so-called proposed topics "PROPOSED TOPIC 1," ..., "PROPOSED TOPIC N," which may be topics identified by the user history analyzer 310 (cf. FIG. 3) as candidate topics of potential interest to a specific user based, e.g., on the recent user interactions of the user in the social network, or identified by the social relationship editor module 304 as candidate topics of potential interest to a specific user based, e.g., on the friends with whom the specific user is connected to in the social network (relationship significance). Of course, the user history analyzer 310 of the social network engine shown in FIG. 3 may also identify certain topics as candidate topics of potential interest to a specific user based on the overall user behavior of users of the social network or subgroups thereof, such as communities. As an example, if the user history analyzer 310 determines that a significant percentage of the users click on websites about specific topics, or if the user history analyzer determines that a significant percentage of all those users that have defined a specific topic as a topic of preference and/or interest (subgroup) click on websites about this specific topic, then the social network engine 300 may propose such topics as proposed topics in the input mask shown in FIG. 4. The individual user may then be prompted to confirm whether he or she wishes to add this proposed topic (or interest) to their list of individual preferences and/or interests (community significance).

As shown in FIG. 4, the user has the option to add and remove any such topics (preferences and/or interests) to or from his individual list, at any time. The user may also subscribe to data feeds about certain preferred topics. For example, the user may wish that a news feed with news about new video games is automatically scanned in accordance with his or her individual preferences and/or interests and that potential new topics of interest are either proposed in the input mask 400 shown in FIG. 4, in the manner outlined above, or even automatically added to his or her individual list of preferences and/or interests.

As shown in FIG. 4, the user may also decide that certain or all preferences and/or interests included in his or her individual list are linked and/or shared with other users of the social network or even with users who are not members of the social network, or that such preferences and/or interests are hidden from and not shared with other users of the network or, as an alternative, hidden from and not shared with specific selected other users or friends that the individual user is connected to.

As shown in FIG. 4, when operating the input mask 400, the user may also assign or readjust so-called weights to selected ones of the above topics. In the sense of the present application, the term "weight" refers to any kind of variable or computational parameter suited to indicate the significance of a respective preference and/or interest to the individual user, which variable or parameter may be used to attribute a higher significance to such topics (preferences and/or interests) when filtering the input data. As an example, a user may decide that the topic "GAMES" and "NEWS ABOUT NEW GAMES" is of high significance whereas the topic "COMMUNITY NEWS" is of almost zero importance to the user. In such a case, the user may assign, e.g., a high significance parameter in accordance with a uniform scale to the favorite topics "GAMES" and "NEWS ABOUT NEW GAMES" and a significance parameter of almost zero to the not preferred topic "COMMUNITY NEWS." All this may be set or adjusted as specifically desired by the individual user, at any time when exploring the social network.

If applicable, the user may add, remove, or change any of the above topics (preferences and/or interests) or assign or readjust desired weights to such topics.

As shown in FIG. 4, the user may set or adjust the graphical representation for each of the above topics. As an example, the user may decide that events relating to video games are shown as circles in his individual timeline accompanied by an icon showing a representative image of the video game, such as the trademark or most important character of the game, and that events relating to his personal activities, such as appointments or conferences in the social network, are shown as squares in his individual timeline accompanied by an icon showing a representative image of the respective activity, e.g., a frog symbol relating to online chats and a mouse symbol for shared online game events.

As shown in FIG. 4, a list of second order subtopics may be attributed to each of the above topics (SUBTOPIC 1, ..., SUBTOPIC N). Each subtopic may be added or removed, and specific weights may be attributed to each of these subtopics, or readjusted. Furthermore, additional "nodes" may be added, which shall relate to the generic term for attributing one or more third order subtopic(s) to a specific second order subtopic.

In this manner, a complex interest cloud representing all preferences and/or interests of an individual user may be built up, as explained in more detail in the following.

Interest Cloud

Specifically, an interest cloud is a defined space of explicit and implicit preferences and/or interests shown, e.g., as weighted keywords that reflect the individual preferences and/or interests of a specific user or a specific group of users towards content (news, blogs, media, games, people, activities, sponsored content, ads, files, pages, etc.). An interest cloud is updated based both on the behavior of the user—the system may implicitly weight keywords based on frequency of interaction of associated content—and/or by the user directly and explicitly adding or removing keywords and increasing or reducing the weight of such keywords, based on his degree of interest, in a manner as set forth above with reference to FIG. 4. The user can re-weight, edit, modify, delete, or perform other changes also on implicit keywords from the system, to further refine his interest cloud. Context keywords are added or layered upon the existing interest cloud to maximize the correct representation of the user's true interests.

The interest cloud will mainly be used in online networks such as web communities and content portals, but is not limited to these specific applications.

The purpose of an interest cloud is to give the user(s) an easy-to-understand, user-controlled, and manageable representation of the user's interests towards content. As a secondary use, the self-managed interest cloud gives content producers (i.e., bloggers, advertisers, manufacturers, communities) a higher hit-ratio and the content will be more accepted by the users if the content is actually in the interest of the recipient.

The interest cloud provides the server with information about keywords the user is or might be interested in, depending on their direct interaction with the keywords, implicit keywords, and contextual keywords. In other words, an interest cloud is a combination of user-defined keywords, auto-keywords, and context-based keywords that help the user to organize his interests.

Content the user has already marked as "interesting to me" will be part of their personal interest cloud by either becoming a keyword itself or by the system deriving keywords from that content. The system creates these implicit keywords by filtering the user's entered profile data, tracking his interaction with content, and noting the data of other users he is connected to, as well as users with similar interest cloud(s). This is not an exhaustive list: other methods can also be used to collect and predict implicit interest for the interest cloud.

In addition, the user (or users) may explicitly define keywords in the interest cloud by weighting their significance to him or her.

The user's context, if available, also adds keywords with weighting and significance to the interest cloud. This can include examples such as geographic position (for instance, being in a music shop in France, being in a movie theater, being in a restaurant, etc.).

Content of an Interest Cloud

An interest cloud contains keywords that stand for certain content, information or activities, and any other possible items (preferences and/or interests). For instance, a keyword can be "politics, news" and link to news about politics in general. Another keyword can target a single subcategory of news, such as local politics or "news, politics, home country." Other keywords could be music tracks, video files, pictures, persons, characters, events, and more.

Any keyword can theoretically link to any other keywords, creating links between products, persons, files, etc., and in any wanted granularity. Thus any keyword is always in the context of its related keywords. Context and relatedness similarity is partly defined by the system and partly defined by the active creation of new contexts by the user. Generally, it is up to the user to control their interest cloud (directly or indirectly, explicitly or implicitly). Each personal interest cloud also influences the overall context, i.e., if a lot of users manually connect to keywords that had not been previously connected by the system, the general context or default connection will be updated as well.

Structure of an Interest Cloud

Individual users can express multiple interest clouds, having a main interest cloud about the high-level content he is interested in, as well as interest clouds for specific content types, people, activities and more. Depending on the sub-pages and content-box, the community or network provides a sub-interest cloud that is focused on the specific interests for that sub-page, content-box, or category.

Example

User A is not interested in news in general, thus he doesn't include "news" in his main interest cloud. But when it comes to music, he is very interested in news about his favorite bands. His main interest cloud doesn't contain any news, but his music sub-group is concerned with everything about his favorite bands—including news.

Likewise, it is possible that the main-interest cloud defines a user's interest in "News" and has sub-interest clouds focused around topics such as music, cars, etc. In this case, the main-interest cloud is given hierarchy over the sub-interest clouds and hence "influences" the overall content that is provided to the user.

Each keyword in the interest cloud has its own weighting and significance attached to it. This reflects how important the item is to the user. The graphical representation of each keyword in the interest cloud reflects this weighting and significance in a unique manner that may also be adjusted individually in accordance with the needs and preferences of the individual user. As an example, the significance of each keyword may be indicated by means of the font size, e.g., a bigger keyword shows a higher degree of importance and a smaller keyword may show a lower degree of importance, but the present invention is, of course, not limited to this kind of display. Other means to display significance could be, e.g., by means of color-coding, numbers associated with the keywords, and the like.

The interest cloud(s) of a user enables the server (social network engine) to process the interest cloud in order to provide the user with a higher relevancy of web-content, media, files, and people in an ordered, prioritized, and organized way.

Implicit Keywords of an Interest Cloud

The interest cloud of a user may also be created dynamically, based upon profile information the user added to his or her individual profile and by the user's online behavior. This automatic creation, and changes afterward, reflects the interests of the user expressed in an implicit way.

The user can also provoke the system to propose implicit keywords based on existing keywords. For example, if the user adds "restaurants" as a keyword to his interest cloud, this may trigger the system to suggest related keywords that might also interest him. These could include "fast-food restaurants," "exotic restaurants," "restaurants near my location," "restaurants my friends like," etc. Such proposals may be made based on an expert system that, e.g., knows or learns from a user's behavior in the past that it is highly likely that a user might also be interested in certain subtopics (e.g., exotic restaurant) if he or she is interested in a certain main topic (e.g., restaurant).

Real-Time Context Keywords

Real-time context-specific keywords may be added dynamically, such as geographic context (being in a city, country, a shop, a restaurant) and other contexts (such as, but not limited to, being in winter, in week 41, etc.). This lets the system retrieve content organized with the help of the user's interest cloud to ensure that it is relevant to the context the user is in.

Explicit Interest Cloud

The user can add, reprioritize, change and delete any explicit and implicit keywords inside the interest cloud, on any level. He or she can also enable or disable, reprioritize, change and delete context-specific keywords, thus changing the interest cloud manually in any way needed to tailor it to his or her satisfaction and his or her context. This may be performed by operating the input mask described with reference to FIG. 4, but may also be performed directly in a graphical representation of the individual interest cloud as outlined below.

Hierarchy of an Interest Cloud

The complete interest cloud of a user may be organized in layers. There is, e.g., one main interest cloud and an open number of special interest clouds. The amount of interest clouds may depend on the actual number of interests the user creates in his profile.

Main Interest Cloud

The main interest cloud of a user contains the most important interest keywords (preferences and/or interests) of the user, on the broadest possible level. Interests of the main cloud apply to all special interest clouds. For example, if the user is interested in music in general, a news interest cloud will include news about music by default, as the system implies that this might be of interest to the user, too.

Special Interest Cloud

A special interest cloud contains all interests a user has in a specific part of the cloud, e.g., all interests about games. By default, a special interest cloud is derived from the main interest cloud, but it can be altered, as described above. As the interest cloud is a constantly changing network of interests linked to each other, the size and granularity of the cloud is highly dependent on the user's behavior.

Storage of an Interest Cloud

An interest cloud may be stored as a network of keywords. The interest cloud is stored in several levels (e.g., main cloud, sub-clouds), is linked to a user or group, and is stored as part of their main profile on the server (social network engine), and is therefore available for the user anywhere when accessing their profile. A user's interest cloud will be stored alongside the profile for as long as that profile exists, and can be modified by the user at any time.

Display of an Interest Cloud

To display an interest cloud in the way the cloud functions in the background, the items may be displayed in different groupings and styles (e.g., the size of a respective interest may indicate the significance attributed to the respective interest). Thus the user can quickly identify his major interests and how the other items are connected to each other.

Figure 5:
FIG. 5 is a graphical representation of a so-called interest cloud showing the preferences and/or interests of the user as a result of setting or adjusting the personal preferences and/or interests when interacting according to FIG. 4.
Figure 6:
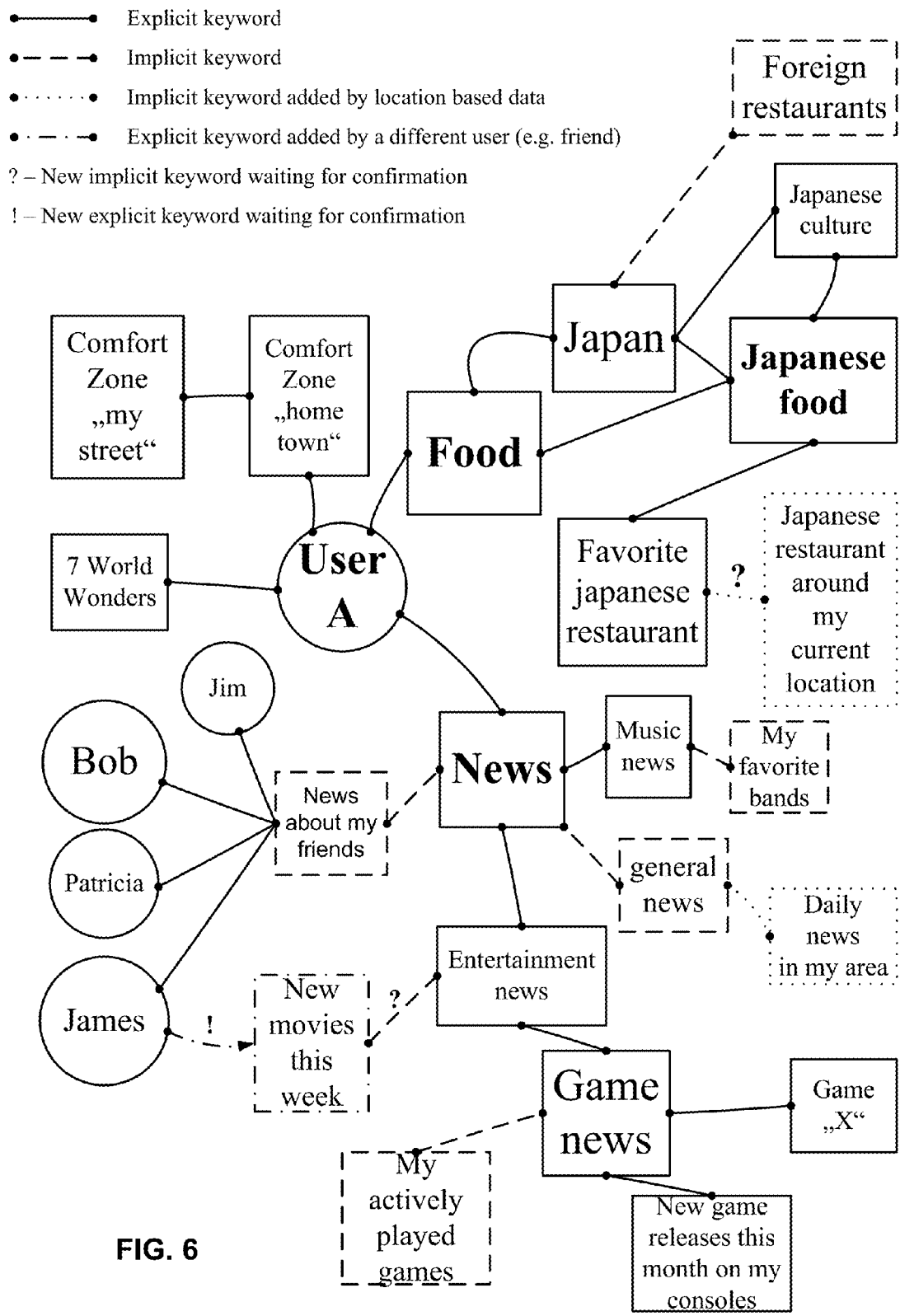
FIG. 6 is another graphical representation showing the preferences and/or interests of the user as a result of setting or adjusting the personal preferences and/or interests when interacting according to FIG. 4.

Two examples of a graphical representation of such an interest cloud are shown in FIGS. 5 and 6, and will be described in the following. It is noted that the following shall not be construed as limiting the scope of the claimed subject matter.

Implicit, system-created interest keywords within the cloud may have a distinguishable look compared to the explicit keywords. This differentiation includes but is not limited to color-coding, different font-size, or the annotation of the keyword with symbols, e.g., @musicgroupname.

Context-created interest keywords within the cloud may have a distinguishable look compared to the explicit and implicit keywords. This differentiation includes, but is not limited to, color-coding, different font-size, or the annotation of the keyword with symbols, e.g., c_paris, c_restaurant.

In FIG. 5, keywords 502a, . . . , 502e in black letters indicate explicit keywords, i.e., keywords (preferences and/or interests) explicitly input by the user, e.g., by using the input mask 400 of FIG. 4. Keywords 504a, . . . , 504e, enclosed by a dashed line in FIG. 5 indicate implicit keywords. In the example, the location of the user while exploring the social network is detected by the user history analyzer (cf., FIG. 3) and communicated to the social network engine, which then proposes candidate keywords such as "foreign restaurants" 504a, "daily news in my area" 504e, or "my actively played games" 504d which may then either be accepted (confirmed) by the user or rejected. This is one example of context-based data.

In FIG. 5, keywords 506a enclosed by a dotted line indicate implicit keywords added by location-based data. As an example, the geographical location of the user's mobile electronic device is continuously detected and communicated to the social network engine, which then, based on an expert system, proposes candidate keywords of potential interest to the user, such as "Japanese restaurant around my current location" 506a, if the system knows that the user has a certain interest in Japanese food, e.g., based on the selection and significance of the topic "Favorite Japanese restaurant" in the list of keywords (preferences and/or interests) of the individual user.

In FIG. 5, keywords 508a enclosed by a dashed and dotted line indicate explicit keywords added by a different user of the social network, such as friends connected to the user. As an example, if both users share the interest of enjoying movies, the second user (or, as an alternative, the social network engine) may propose to the first user to add the item "new movies this week" 508a to his interest cloud. The first user is easily aware of this proposal, because this proposal may be clearly marked, for example, by means of color encoding explicit keywords added by a different user. The exclamation mark "!" 510 in the interest cloud (or any other suitable graphical symbol) indicates that the new explicit keyword 508a needs to be confirmed before it will be added as a real effective keyword to the individual interest cloud of the first user. Of course, if the first user should reject (not confirm) the proposed keyword, it will finally disappear (or become inactive) in his individual interest cloud. As an alternative, the proposed keyword may become active (effective) if the user should not respond to the proposed keyword during a given time period.

In FIG. 5, the question mark "?" 512 (or any other suitable graphical symbol) indicates that the new implicit keyword 506a needs to be confirmed before it will be added as a real effective keyword to the individual interest cloud of the first user. Of course, if the first user should reject (not confirm) the proposed keyword, it will finally disappear (or become inactive) in his individual interest cloud. As an alternative, the proposed keyword may become active (effective) if the user should not respond to the proposed keyword during a given time period.

As will become apparent to a person skilled in the art, instead of changing or readjusting the individual preferences or interests in an input mask, such as that shown in FIG. 4 and explained above, the user may, of course, also grasp certain keywords in the interest cloud shown in FIGS. 5 and 6 and move or manipulate these keywords as desired to thereby establish new user-specific preferences and/or interests. As an example, by dragging the keyword "News about my friends" from the left-hand side of the interest cloud towards the right-hand upper part of the interest cloud, i.e., near the keyword Japan, new links between keywords may be established, linking, e.g., news about all those friends of the user that are interested in the topic Japan, to thereby establish a link between these friends and the topic "Japan."

The above interest cloud is a small example of how the concept works. The keywords of the example may be marked using different colors to show the status of the different keywords. For example, black keywords may be edited by the user, while green ones may be implicit and were added by the system as suggestions to the user, based on his interests. A blue addition may also be an implicit keyword, but is added based on the current location of the user. A red keyword may be a suggestion by a friend of the user.

Question marks 512 in the above example show where new additions are made by the system that the user might want to edit. They are an optional feature to highlight changes in the interest cloud. Exclamation marks 510 are similar, as they also wait for confirmation, but were added explicitly by a friend of the user, and thus have a different quality to the interest cloud.

Of course, different graphical representations of the interest cloud may also be utilized, implying different graphical encodings for relationships and functionality. One example for such an alternative graphical representation is shown in FIG. 6, where the different sizes of graphical symbols, namely circles, indicate the weights attributed to specific keywords displayed in the interest cloud.

As will become apparent to a person skilled in the art, many different styles of graphical representations may be utilized for displaying the individual keywords (preferences and/or interests) of an individual user.

Obtaining Input Data

Figure 7:
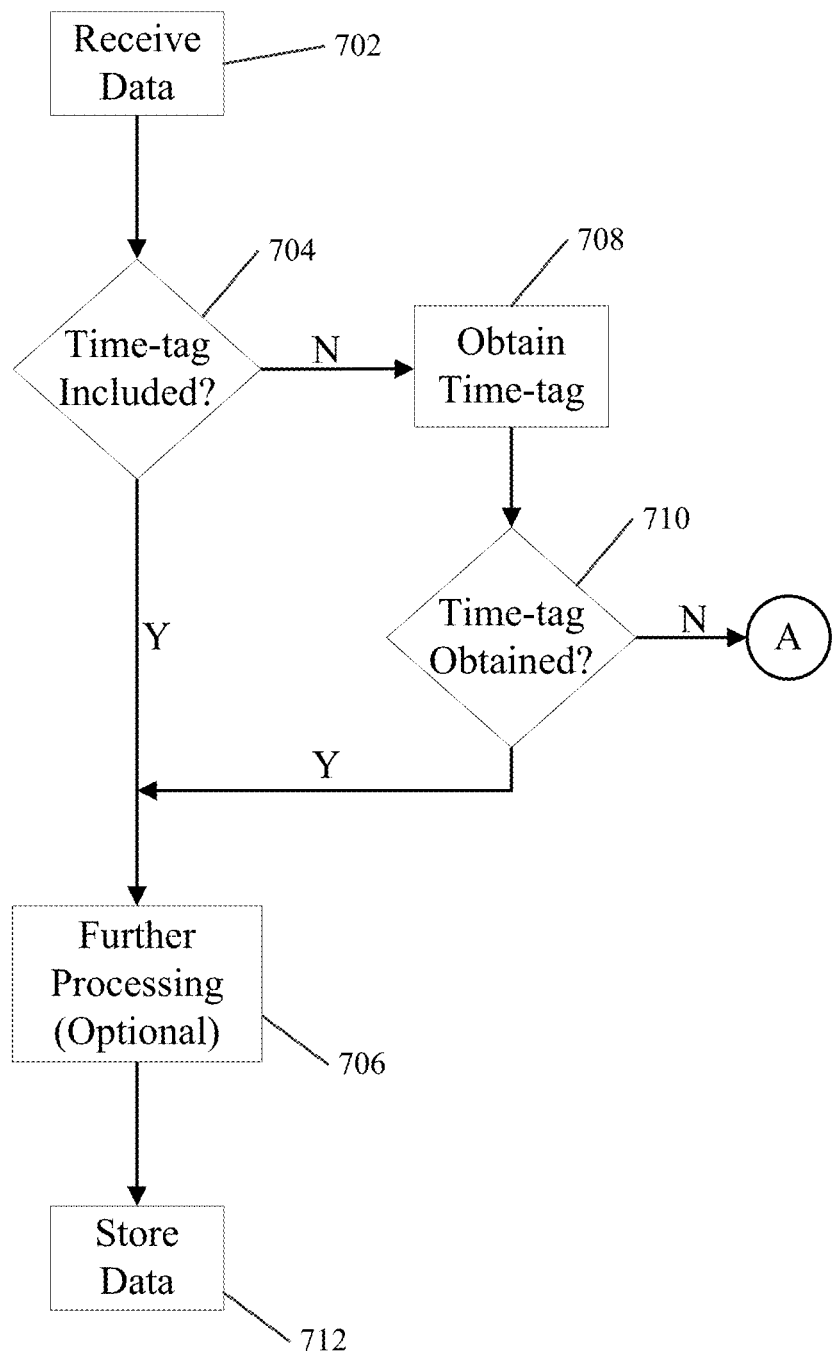
FIG. 7 is a schematic flow diagram of a process for obtaining input data in a method according to an embodiment.

As shown in FIG. 7, the social network engine receives 702 input data in various different ways and from various different sources, as outlined above. One way of inputting such input data may involve a user of the social network (or as an alternative, a subscriber to services of the social network) directly entering a message about a future event and a related time-tag about the start of the event, such as "The new video game XXX will launch on DD-MM-YYYY." This message may be accompanied by additional information, such as a link to a website with background information about the video game.

In a next step, it is checked 704 whether the received or input data include a time-tag indicating the date of some kind of event. Preferably, once a datum is associated with a time-tag, the time-tag is either in a pre-defined data format or the existence of the time-tag is indicated by a flag or similar indication in the data enabling a quick and simple search for such time-tags and further processing. As an example, a user may enter data (information) about an event, together with time information about the exact date and possibly also the time and duration of the event and, according to the present disclosure, the data about the event and the time-information (time-tag) are linked with each other.

If the data includes a time-tag, the process continues with a step of further processing 706 the input data, as described below in more detail. On the other hand, if the data does not include a time-tag, the process tries to obtain 708 a time-tag in an additional process step. For this purpose, the user may explicitly be prompted to enter relevant time information for an event of interest. Alternatively, the social network engine may try to obtain such time information based on other information sources, such as a search in the social network, in an internal or external data base for related time information, or based on a contextual search procedure, where, based on contextual information about the event, the social network engine performs a search for time information associated with the event. If such time information can be obtained 710 in this manner, it may be used or further processed as a time-tag, either automatically (i.e., without further user input), or requiring an explicit confirmation of the user. When, as a result of this process step, the time-tag is finally obtained, the process continues with further processing 706 of the input data. Otherwise, the process may continue with a fallback routine and return to the step of "receiving input data" 702.

The input data, which includes a time-tag in the prescribed manner, are then sent as a message to target users, which are determined by the system as users having individual preferences and/or interests matching to the keyword(s) accompanying the input data. This determination is performed based on the data on individual preferences and/or interests maintained in the computer system of the social network. Preferably, this determination of target users additionally takes into account the keyword(s) associated with the message to be sent and it is determined additionally whether the keyword(s) match(es) accompanying the message to be sent match with the individual preferences and/or interests of the respective target users.

Once such a matching is determined by the computer system, the message will be sent to such target user(s) and preferably automatically entered in a list of events of the target user(s), as outlined below in more detail.

The input data may be further processed in various manners. As an example, the input data may be stored 712 in a database accessible by all or selected users of a social network via the social network. Alternatively, the input data may be associated with various kinds of keywords and stored in a database of the social network, thus enabling a quick and simple categorization of the data in accordance with, e.g., individual user preferences and/or interests. Alternatively, the data may be sorted in chronological order, in accordance with the time history given by the time-tags associated with the data. The data may then be stored in the database in this chronological order. As yet another alternative, the social network engine may generate a link to the event and some keyword information about the event that will be sent to the individual user later, instead of transmitting all of the detailed information about the event. By clicking on the link or some other kind of icon, the user may then retrieve all necessary information about the event, only if needed, to save computing time and transmission bandwidth otherwise. As will become apparent to the person skilled in the art, many different ways of further processing can be performed for the input data.

Figure 8:
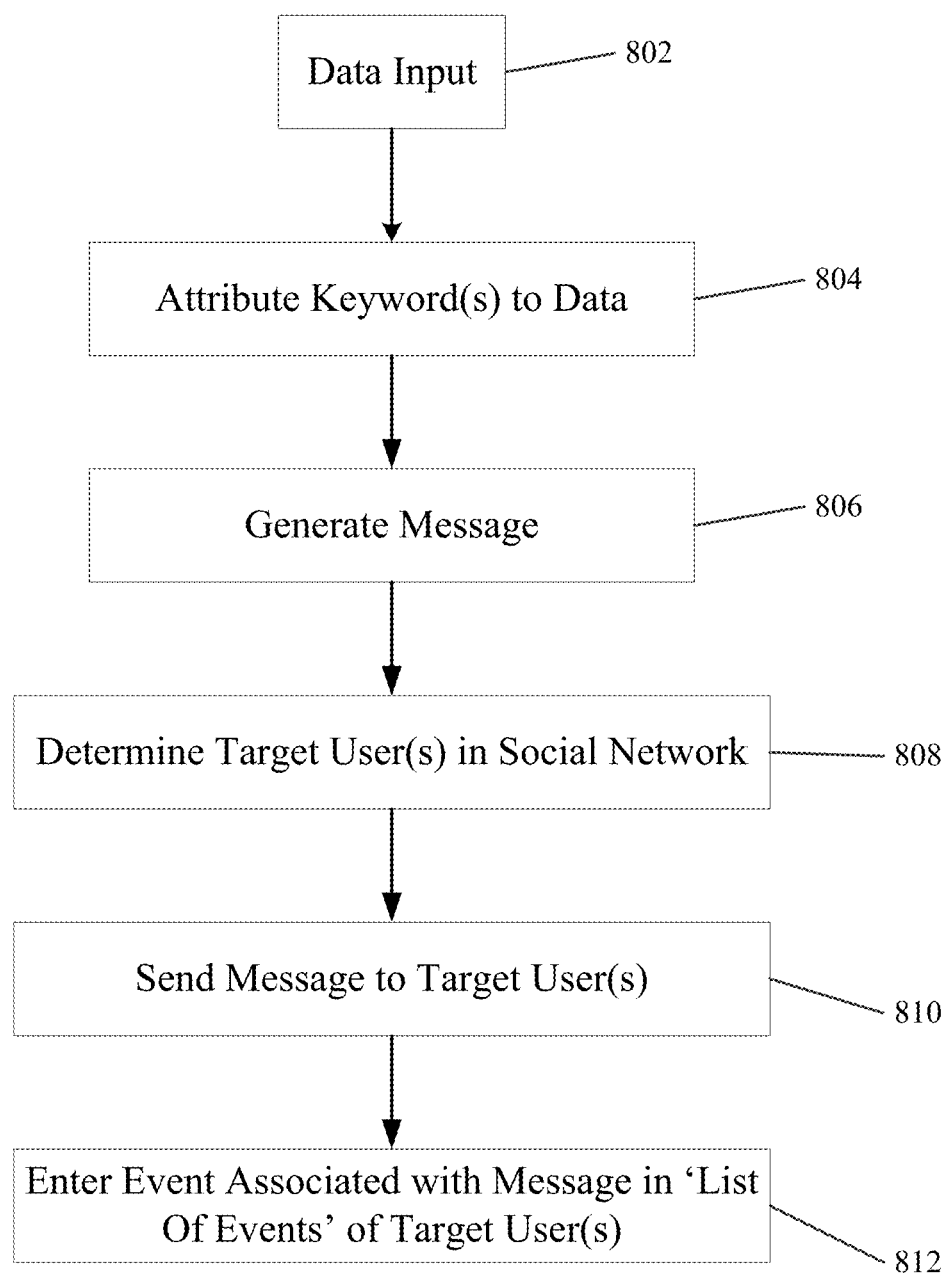
FIG. 8 is a schematic flow diagram of a process for generating and displaying a timeline according to an embodiment based on the data input according to the process of FIG. 7.

FIG. 8 briefly summarizes a method 800 for posting messages about future events to users of a social network according to an embodiment.

Once the data about future events are input by a user 802, as outlined above, and also at least one keyword is associated with these input data 804, a message about the future event is generated 806. In a next step 808, target users in the social network are determined based on their individual preferences and/or interests, as stored in the social network engine, and a matching of the keyword(s) associated with the message and the event contained therein and the individual preferences and/or interests of the other users of the social network (or as an alternative directly with the content of the message itself).

Once such target users are identified, the message is sent 810 to the target users and the information about the event included in the message is entered 812 in the individual list of events of the target user(s).

This does not exclude, of course, that other data may also be provided to the user together with the message. However, the messages generated based on the input data are usually treated or transmitted with higher priority to the specific target user(s). In particular, as shown in FIG. 8, these data may also be further processed in such a way as to enable direct entry of these messages or information about future events in the individual list of events of the target user(s). Each target user's list may then be built-up automatically on the display of the electronic device of the target user(s), e.g., as a timeline as explained below, or as a calendar of an office application of the target user(s).

Timeline

According to a preferred embodiment, the list of events of the target user(s) is built up as a timeline as explained below in more detail with reference to FIGS. 9 to 11. However, the present disclosure is not limited to such a timeline. The list of events may be any chronological listing of events suitable to display the future (and also past) events of a user on a display or recording medium, including paper. Such a listing may be a table of events for a word processing application, a spreadsheet including a listing of events of a standard office application, an electronic calendar showing the days of a year together with the events happening at the respective days, and the like.

In general, the timeline is a suitable graphical representation of events and/or entries, which are of interest to a specific user (target user) and which are displayed on the timeline in their chronological order. In general, the timeline may be displayed as a horizontal (or vertical) line or as a line inclined under any angle in between with a clear mark describing "today" or the current moment as the clear border between the past and the future. Anything on the one side of the mark is history, and anything on the other side of the mark is in the future. On the line representing the time, e.g., in the future, are upcoming, past, or current moments (events or entries) related to activities, people, events, or content called "entry" that have varied importance through what is identified as significance to the user. For displaying each entry, suitable simple graphical symbols are used, such as circles, triangles, squares, or even icons directly representing (summarizing) the event or entry on the timeline.

Figure 9:
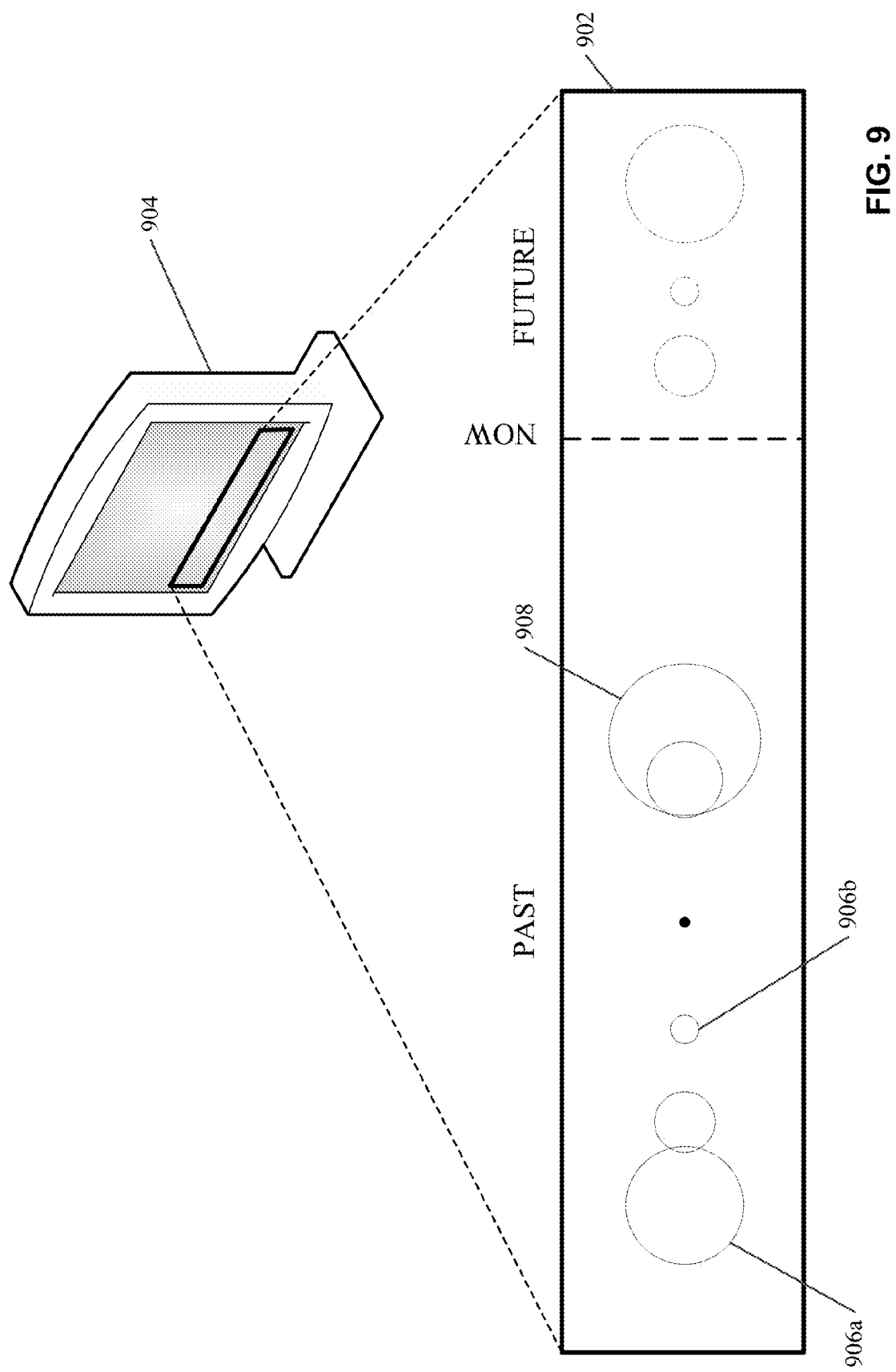
FIG. 9 is a schematic diagram showing a timeline according to a first aspect of the present disclosure.

As shown in FIG. 9, the timeline 902 may be displayed, e.g., along the bottom rim of the display 904 of the electronic device used by the user to access and explore the social network. Such a bar-like timeline may be displayed as a permanent background symbol on the user's display, unless the user requests a larger or different representation of the timeline, e.g., by zooming into the timeline or clicking onto a button which causes the timeline to be built-up on the entire display of the user.

As shown in FIG. 9, the size of the graphical symbol 906*a*, 906*b* (e.g., circle) that indicates an event and/or entry on the timeline 902 represents its significance to the user in relation to the other events or entries. There may be provided a directly proportional dependency of the size of a graphical symbol 906*a*, 906*b* on the significance of the event or entry to the user. This dependency may, however, also be stepped or non-linear, as desired by the user. As an example (using circles as an example of the graphical symbol for an event or entry), circles of a first diameter may indicate events or entries of a significance below a first threshold value, circles of a second diameter, which is larger than the first diameter, may indicate events or entries of a significance above the first threshold value but below the second threshold value, and so on.

Of course, instead of 1D graphical symbols, the events or entries on the timeline may also be displayed as bars, discs, or other suitable 2D or 3D graphical symbols (arranged around the timeline), where the height of the graphical symbol encodes the significance of the event or entry associated therewith.

The user can move the displayed partition of the timeline 902 either into the past or into the future. He can zoom into the timeline 902 to explore a certain moment in time, opening more details on that moment. Further, the user can scroll into the "depths" (moving the timeline 902 closer to him or further away) to filter the timeline 902 by different entry themes, e.g., looking only at news, activities about friends, gaming activities, etc.

Significance can be displayed in context to the user, to friends (connected to the user), to overall community, and other segmentations in order to measure the significance of the user's entries compared to more than just himself. The significance over time can grow and update itself. When a user checks the timeline 902 at a later time, he can see a bigger significance if an entry increased its significance between his previous and his current access of the timeline.

The timeline may also provide a graphical representation 908 that clearly indicates the change in significance of events or entries over time, e.g., between a previous log-in of the user and the current log-in. As an example, a rim around a circle of an event or entry in a different color than the circle may represent an increase (decrease) in significance between two subsequent log-ins of the user.

Structure of a Timeline

According to an embodiment, the events of the messages received by a target user are automatically entered in the individual list of events (e.g., timeline 902) of the target user. However, in principle, the user can also define the kind of events he or she wants to place on the timeline 902. Users can set rules regarding which entries should be placed on the timeline automatically. In at least one embodiment, by default, all entries are displayed and can be filtered by similar categories as used in the user's interest cloud.

Entries placed on the timeline 902 appear as text information or as suitable graphical symbols 906*a*, 906*b*, such as circles. Next to the circle, a small icon may show the category of the entry. Hovering over the icon with a pointing device or finger may offer more information about the event or entry. Clicking the icon can connect directly to an information page about the event or entry, the page of the event or entry itself (if applicable), to the creator of the event or entry, or any link specified by the creator of the link or the owner of the timeline.

Explicit entries cause the system to create explicit-sized graphical representations automatically, through measuring the significance of the entry. For example, if a user uploads a video and it is very popular, the uploaded video may create an entry and soon, reflecting the popularity of the video, a big graphical symbol may grow in association with the entry, and as long as the popularity of the video grows, the graphical symbol may continue growing in size. Since the overall size would be relative to the user, his friends, or other segments, the size of the graphical symbol would alter in the display. Such entries may be implicit entries with automatically-sized graphical symbols.

In at least one embodiment, a user can modify a graphical symbol of an implicit event or entry and override it as to an entry that the user feels explicitly as representative in significance to himself.

In at least one embodiment, a user can add explicit events or entries with manually-created graphical symbols to allow the user to define their significance for himself, for example an event comprising a special experience with a high score achieved, or the birthday of a very important person.

The size of the future entries' graphical symbols can be based on the user's personal settings, as much as on recommendations of the creator of the entry graphical symbol. The size does not have to be a fixed value. For example, a product manufacturer can decide that the graphical symbol of the entry should be scaled related to the user's interest in a certain product. Thus, the more a user is interested in the event about a product, the bigger the graphical symbol will be. Likewise, if the symbol's significance is relatively specific to the overall community, the size of the symbol would show the significance of the entry relative to overall community.

Next to each entry's graphical symbol, an information box can be displayed to show more information about the entry. Hovering a mouse pointer or other input element over the information box highlights the graphical symbol and offers more actions that can be activated. For example, an entry about an event sent by a friend may offer the following actions to (a) start a chat with the friend, (b) visit his page, (c) visit the page of the event, or (d) delete the event from the timeline. Additional contextual actions are possible depending on the entry.

Searching a Timeline

A timeline may be structured such that the user can search through the timeline in different ways. For example, a timeline may allow the user to manually scroll along the line forward and backward. The user may also filter the events in the timeline, for example, by different categories, or he can search for tag words (which can be saved as a new filter).

The timeline entries can be colored in different shades to ease the search. Furthermore, in combination with the different sizes, scrolling along the timeline can ease the search for certain entries.

Automatic Creation of Timeline Entries

An entry made online by a user can be placed on the timeline, depending on the settings the user sets. Thus, if a user plays an online game, the entry may be placed as an entry graphical symbol on the timeline. If the player wins the game, plays for a certain amount of time, or plays with his favorite friends, the graphical symbol might be bigger to display the social significance of this event.

Visibility on the Timeline

In at least one embodiment, the user can set certain filters on the visibility of the timeline entries. Thus, the user can view activities marked as private, friends, public, or game-related to name a few examples. As a default, all entries are visible on the timeline.

To show the user that the timeline is in a filtered state, entries that are currently not displayed may be rendered in a different visual style (for example, blurred or greyed out, or shown in a 3D style in the background). If these entries are enabled again by changing the filters, the entries may move back into view, e.g., to the front.

To show that entries have changed (e.g., their significance and circle size has changed), the circle outline may be animated (i.e., showing an expanding or shrinking animation) or the color/brightness is animated.

For various reasons, the visualization can be changed from a continuous timeline to a table view, known as a typical calendar view, wherein each day, week, month, or other defined timeframe can be displayed as, for example, boxes.

Maintenance and Management of the Timeline

In at least one embodiment, the user can manipulate the events and entries on the timeline in many different fashions. Filters, as mentioned above, can be used to apply certain actions to events and entries on the timeline. For example, filters can be used to cause all events and entries about games to increase in importance, or be deleted or moved.

Any action can be applied to individual events and entries, to groups of entries (groups can be defined by filters, by searching, or by other methods), or to all events and entries.

The user can search through all events and entries looking for certain tag words. Applying search words to the timeline may dynamically highlight all appropriate hits, while all other entries move to the background.

The user can apply alarms to future entries that will inform him in time of the entries. These alarms can be set per single entry or for any group of entries.

Display of a Timeline

Figure 10:
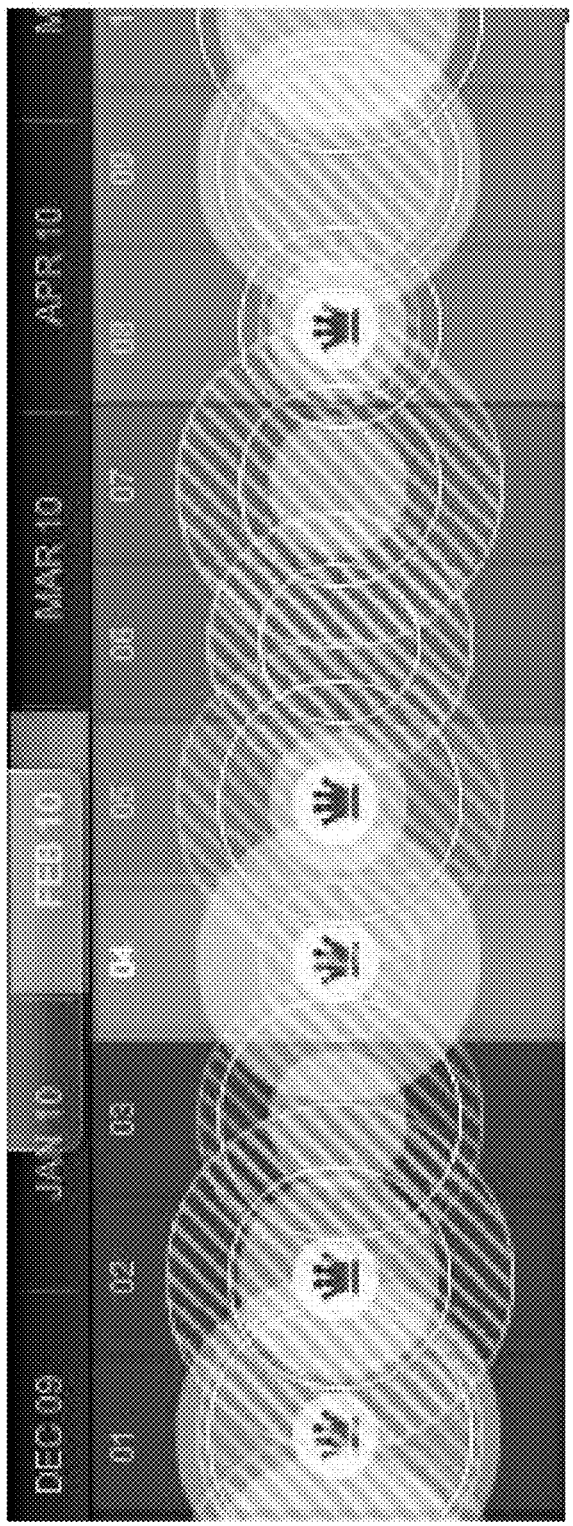
FIG. 10 is a schematic diagram showing a timeline according to a second aspect of the present disclosure.
Figure 11:
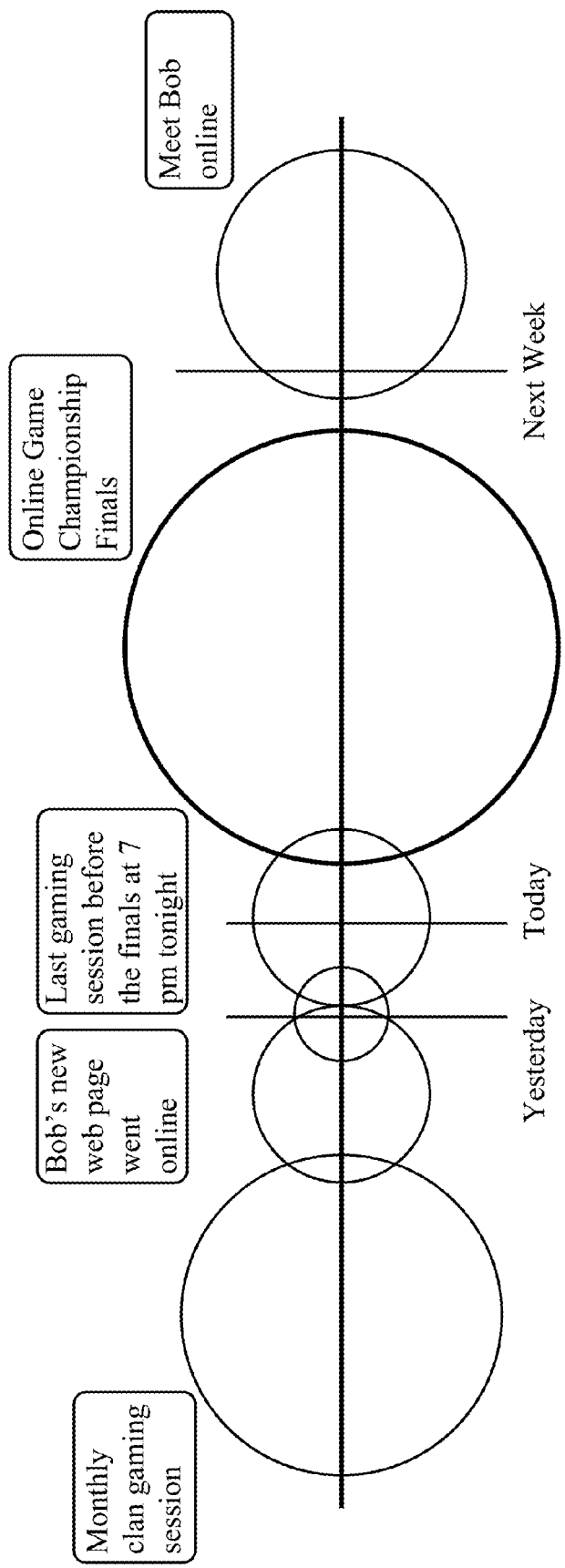
FIG. 11 is a schematic diagram showing a timeline according to another aspect of the present disclosure.

FIGS. 10 and 11 show two variations of a timeline according to the present disclosure. Both are examples, are not the final renderings, and shall not be construed to limit the scope of the claimed subject matter.

The first version according to FIG. 10 shows a timeline with a possible color and style theme. The user is able to display the timeline with different themes.

The second table according to FIG. 11 shows a schematic of the timeline concentrating on the main features.

Examples of Posting Messages

In the following, further examples of a method for posting messages according to embodiments of the disclosure will be explained in more detail.

Essentially, a system as described herein provides a unique way of social networking via a list of future events, shown for example as a timeline, a calendar of an office application, or a posting list that illustrates when future plans will take place. Indeed, the system resembles basically a 'matchmaking' service between people organizing or taking part in an event, and other users who may also be interested in that event (target users). The system can be used by individuals and companies to arrange activities online (such as gaming sessions among groups f friends or a sale at a particular website) and offline (for example, a flashmob or announcing and advertising of a concert tour).

User Input

In at least one embodiment, the user can send a message announcing a future event. All he needs to do is write a message and add a time stamp (time-tag) that is set in the future. In addition to these two minimum requirements, further options can be added, which are not essential for the example to work. A future activity or event can be, but is not limited to, any of the following examples:

(a) An individual expressing an intent to play a certain computer game online tomorrow at 3 pm;

(b) A company announcing a sale of a specific product on a specific website for a six hour period next week;

(c) A user or group of users posting about a flashmob to take place at a specific location in four hours' time; or (d) A public relations (PR) or management agency announcing concert details for a band or artist, to take place on a number of dates and locations over the next three months.

The user can then attach a time-stamp to the message and send it to the system. Further, the user can set one or more filters for the message to help determine how the message will be forwarded to or seen by its recipients. Adding filters is entirely optional. If the user chooses not to set any filters, the message can be seen by anyone. In the case of the four examples listed above, filters that may be set include, but are not limited to:

(a) Friends of the user, and fans of the computer game;
(b) Anyone;
(c) Friends of the user or group of users, and people who live/work near the targeted area; or
(d) Fans of the artist, namely people who live in the city where one of the concerts is to take place.

Advanced Time Stamp

An advanced time stamp of a future activity (future event) may contain the start time and may additionally include the end time and/or time duration of the activity. For most activities, a single time suffices, as many activities are self-explanatory in their length. Thus the default time stamp refers to the start time of the activity.

To offer more flexibility, the creator of the entry for the future activity or event can add the end time of the activity too. This helps if the activity is spread over a longer period, e.g., a whole week.

The end time of the activity may help the system and xsearch queries to determine if a certain activity is still active.

Description of the System's Activity

Generally, the moment a message is sent to the system, it will appear in the list of events (e.g., timeline as shown in FIGS. 10 and 11) of each recipient. Recipients can also receive messages via any other compatible interface, such as an email program, in which case the message would show in the recipients' calendar, or with an installed application on a mobile phone, for example. Although the message may be received as soon as it is sent, the message automatically places itself in the list at the time the event will take place.

Recipients may be initially determined by the system, based on user profiles and interests and past user activity. As discussed, any filters set by the user supplying the event information will have a secondary impact on which users receive the message. Returning to our the aforementioned examples, pertinent factors may include, but are not limited to:

(a) Friends of the sender, fans of the game, and/or people who have previously played online games with the sender;
(b) People whose interests include sales and bargains and the product and/or website, and/or people who have shopped at the website or bought a similar product in the past;
(c) People whose interests include flashmobs, friends of the sender(s), people interested in the event the flashmob may be designed to support/highlight, people local to the intended location, and/or people who have previously attended flashmobs; and
(d) Fans of the artist in question, people local to a certain concert, and/or people who have previously attended concerts by the same artist or who have bought their music.

These user interests and filters (where applicable) allow the system to determine not only who may see the message, but also the message's degree of importance (significance). For instance, in the case of the first example, friends of the sender who are not fans of the game or who have not played online games with him/her before may find the event is marked as being of relatively low importance. Friends who are also fans and/or have played with him/her before will see the event is marked as being of much higher importance.

Recipients of the message may then interact with it, posting comments such as an intention to join in or—in the case of example (d)—a link to the ticket website so that groups of connected participants can buy tickets and arrange to sit together. These messages can then be seen by all the other recipients as well as the sender of the original message.

Of course, an importance or significance value may also be attributed to the keywords associated with a message to be sent to target user(s).

Format of the Message

A future activity-message may have certain values attached to it, such as:
(1) the text content of the message;
(2) the future date on which the message's activity is supposed to be happening; and
(3) the author of the message.

Display of the Message

The message may be directly linked to its time stamp in the future and is therefore placed not at the position of its creation date in the posting list, but at the position of the future date. Therefore, the message may move in front of other messages that are simple non-future activity messages and such future activities that happen before the future activity of the message. Thus the messages in a posting list are sorted by their future activity time stamp first, then by their creation date if no future time stamp is given (e.g., all standard messages).

Future Search

This feature of an online social network enables users to carry out a future search, either to find forthcoming events that may be of interest to them, or for example, to see hype and trends surrounding a certain product or event. A user can enter a specific keyword or keywords to find events tailored to his interests. For instance, a search for a new band that the user is interested in and the name of his hometown will show any local upcoming events that include or feature that band. He may then add the band name to the list of interests in his profile, to ensure that he will be sent more information along these lines.

A similar search can be carried out on a much larger scale. This allows a marketing company, for example, to see the impact that a product or event that they are promoting is having on the market, and show the dates that users intend to buy the product/go to the event/see the movie, etc. The feature can also be used to highlight any widespread future trends based on future intentions. All of this data may be presented in a user-friendly way, from timelines to graphical representations, such as, for example, pie charts.

Use Case 1: Analyzing an Upcoming Product Launch

In this example, a company C is planning to launch a new product P in three weeks. To build up attention for the upcoming launch, the company creates a future activity for the day of the launch. The future activity is targeted towards known followers of the company. During the three weeks, the company can obtain information regarding the amount of users that read the message about the launch, hoping that by sharing the message with other users, the amount of followers increases. In addition to knowing the number of interested users, the company can analyze what other interests these users have (and share) to create a demographic of their future target group of clients of the new product.

Thus, the method according to the present disclosure may also be configured to provide feedback from the respective target user to the social network engine. As an example, once a target user reads the received message and/or clicks on a link included in the message or interacts with the message in any other way, this interaction is monitored and analyzed by the user history analyzer 310 (cf., FIG. 3) of the social network engine 300. Thus, as an example, the user history analyzer 310 can simply count the total number of clicks on a hyperlink generated in response to the messages sent to the target user(s) and/or of followers (friends) of such target user(s). Of course, other kinds of feedback may also be utilized for purposes of the present disclosure.

The system described herein allows a person to post a message about a future plan that can be seen to be taking place at a specified time rather than the time that the message is sent (i.e., "now"). The message appears in a list of events, such as an individual timeline or a posting list of the sender and any recipients (target user(s)) that the system decides will be interested in the message, at the time when the activity is supposed to happen. The message is displayed based on filters selected both by the sender and the recipient.

As with other forms of social networking, the message is generally not sent to any specific recipients and, as with an online calendar, the message appears in relation to the time it will take place.

As will become apparent to a person skilled in the art, the method according to the present disclosure provides added visibility of information related to activities, events, content, and people—collectively known as moments—and it is, in particular, the visualization of the dynamic significance that changes the timeline into an easy-to-use productive social life tool when using social networks.

While various embodiments have been described above, it should be understood that they have been presented by way of example only, and not limitation. For example, any of the elements associated with the social network engine may employ any of the desired functionality set forth hereinabove. Thus, the breadth and scope of an embodiment should not be limited by any of the above-described exemplary embodiments.

The embodiments of the invention in which an exclusive property or privilege is claimed are defined as follows:

1. A computer-implemented method for posting messages about future events to users of a social network, comprising:
    maintaining in a computer system, for each user of the social network, data on individual preferences and/or interests of a user;
    obtaining input data including data on an event taking place in the future;
    attributing a time-tag indicating a date of the future event to the future event corresponding to the input data, including obtaining, by the computer system, time information based on at least one other information source if the input data does not include a time-tag, and using the time information as the time-tag;
    attributing at least one keyword to the future event, wherein the keyword indicates preferences and/or interests of users that might be interested in receiving information about the future event, wherein the at least one keyword is input by a first user inputting the input data and is automatically attributed for said event based on said input data and a contextual search relating to said input data;
    generating a message to users of the social network, including at least the data on the future event and the time-tag;
    determining, based on the data on individual preferences and/or interests maintained in the computer system and on the at least one keyword, one or more target users having individual preferences and/or interests matching the at least one keyword;
    sending the message to the one or more target users via the social network; and
    automatically entering the future event in a list of events of each of the target users based on the message, wherein the events in the list of events are sorted in their chronological order based on respective time-tags such that posted messages about said future events can be seen to take place at a specific time rather than a time that said message was sent.

2. The computer-implemented method as claimed in claim 1, further comprising weighting the at least one keyword with a keyword significance value, wherein the target users are determined based on the at least one keyword and in accordance with the respective keyword significance value of the at least one keyword.

3. The computer-implemented method as claimed in claim 1, wherein the time-tag comprises information on the start of the future event and the time duration and/or end of the future event.

4. The computer-implemented method as claimed in claim 1, wherein:
    at least one target user interacts with the message and/or with the future event entered into the list of events of the at least one target user, and
    a result of the interaction of the at least one target user with the message and/or the future event in the list of events is detected by other target users receiving the message via the social network and/or by a social network engine running the social network.

5. The computer-implemented method as claimed in claim 4, wherein the interaction comprises at least one of: creating a secondary message in response to the message, clicking on a link to a website, responding to a request for further data input, and/or taking an action prompted in the message.

6. The computer-implemented method as claimed in claim 1, wherein entering the future event in the list of events of each of the target users based on the message comprises:
    determining a graphical representation of the future event in accordance with the individual preferences and/or interests of a respective target user; and
    displaying the future event in accordance with the determined graphical representation.

7. The computer-implemented method as claimed in claim 6, wherein the graphical representation is further determined in accordance with a keyword significance value used for weighting at least one keyword attributed to the input data.

8. The computer-implemented method as claimed in claim 6, wherein:
    the computer system further maintains a plurality of relationships among members of the social network, each relationship comprising a connection between at least two members of the social network and being associated with a relationship significance; and
    the graphical representation of the future event in the list of events of a first target user is further determined in accordance with the relationship significance of at least one second target user of the social network connected to the first target user.

9. The computer-implemented method as claimed in claim 6, wherein:
    the computer system further maintains a community significance, which is attributed to all members of a community of the social network and represents a global significance of events; and
    the graphical representation of the future event in the list of events of a first target user is further determined in accordance with the community significance.

10. The computer-implemented method as claimed in claim 9, wherein:
    the community significance is dynamically adjusted; and
    a difference between the present graphical representation of a selected event and a previous graphical representation of the selected event is displayed in the list of events.

11. The computer-implemented method as claimed in claim 6, wherein the list of events of a respective target user is an individual timeline, and wherein the graphical representation of each event displayed in the timeline is dependent on the individual preferences and/or interests of the respective target user.

12. The computer-implemented method as claimed in claim 11, wherein a scale of the timeline, or of at least one subsection of the timeline, is varied in accordance with a user command.

13. The computer-implemented method as claimed in claim 11, wherein the graphical representation of each event in the timeline consists of a two-dimensional or three-dimensional geometrical object and visual information about said event.

14. The computer-implemented method as claimed in claim 11, wherein the graphical representation is configured to establish a connection to a website or resource containing information.

15. The computer-implemented method as claimed in claim 11, wherein the step of obtaining input data comprises at least one of:
  monitoring and analyzing a user's interaction with an electronic device;
  receiving and analyzing data provided by an external database, external service provider, or a data feed from a source external to the social network; and
  monitoring and analyzing the user interaction of at least one other user of the social network.

16. The computer-implemented method as claimed in claim 15, wherein the step of monitoring and analyzing the user interaction of at least one other user of the social network comprises:
  monitoring and analyzing the user interaction of at least one member of the social network who is connected to the user via the settings of the user's profile or of a friend's profile.

17. The computer-implemented method as claimed in claim 15, wherein the step of monitoring and analyzing the user interaction of at least one other user of the social network comprises:
  monitoring and analyzing the user interactions of all members of the social network or of all members of the social network having identical or similar preferences and/or interests; and
  displaying at least one selected event in the individual timeline of the user, wherein said displaying includes:
    displaying a candidate event;
    prompting or waiting for an interaction of the user with the candidate event confirming that the candidate event shall be displayed differently; and
    displaying the candidate event differently to thereby enter the event in the individual timeline of the user.

18. The computer-implemented method as claimed in claim 1, further comprising:
  prompting a target user to perform a search for an event matching at least one search criterion among the events displayed in the list of events of the target user;
  performing the search for the event matching the at least one search criterion among the events entered in the list of events of the target user in accordance with a response of the target user to the step of prompting; and
  selecting one or more events in the list of events of the target user matching the at least one search criterion of the response by the target user.

19. The computer-implemented method as claimed in claim 18, wherein the step of prompting the target user to perform a search for an event matching at least one search criterion comprises at least one of:
  prompting the target user to enter the at least one search criterion; or
  prompting the target user to enable an access to at least one search criterion pre-defined by the target user and stored in the computer system.

20. A computer system configured to operate a social network comprising a plurality of members, wherein the computer system is configured to perform a method for posting messages about future events to users of the social network by:
  maintaining in the computer system, for each user of the social network, data on individual preferences and/or interests of a user;
  obtaining input data including data on an event taking place in the future;
  attributing a time-tag indicating a date of the future event to the future event corresponding to the input data, including obtaining, by the computer system, time information based on at least one other information source if the input data does not include a time-tag, and using the time information as the time-tag;
  attributing at least one keyword to the future event, wherein the keyword indicates preferences and/or interests of users that might be interested in receiving information about the future event, wherein the at least one keyword is input by a first user inputting the input data and is automatically attributed for said event based on said input data and a contextual search relating to said input data;
  generating a message to users of the social network, including at least the data on the future event and the time-tag;
  determining, based on the data on individual preferences and/or interests maintained in the computer system and on the at least one keyword, one or more target users having individual preferences and/or interests matching to the at least one keyword;
  sending the message to the target users via the social network; and
  automatically entering the future event in a list of events of each of the target users based on the message, wherein the events in the list of events are sorted in their chronological order based on respective time-tags such that posted messages about said future events can be seen to take place at a specific time rather than a time that said message was sent.

21. A non-transitory computer-readable storage medium having stored thereon executable instructions, wherein the instructions, in response to execution by a processor, cause the processor to:
  maintain in a computer system, for each user of the social network, data on individual preferences and/or interests of a user;
  obtain input data including data on an event taking place in the future;
  attribute a time-tag indicating a date of the future event to the future event corresponding to the input data, including obtaining, by the computer system, time information based on at least one other information source if the input data does not include a time-tag, and using the time information as the time-tag;
  attribute at least one keyword to the future event, wherein the keyword indicates preferences and/or interests of users that might be interested in receiving information about the future event, wherein the at least one keyword is input by a first user inputting the input data and is automatically attributed for said event based on said input data and a contextual search relating to said input data;

generate a message to users of the social network, including at least the data on the future event and the time-tag;

determine, based on the data on individual preferences and/or interests maintained in the computer system and on the at least one keyword, one or more target users having individual preferences and/or interests matching the at least one keyword;

send the message to the target users via the social network; and automatically enter the future event in a list of events of each of the target users based on the message, wherein the events in the list of events are sorted in their chronological order based on respective time-tags such that posted messages about said future events can be seen to take place at a specific time rather than a time that said message was sent.

* * * * *